United States Patent Office 2,819,245
Patented Jan. 7, 1958

2,819,245
SILOXANE-EPOXIDE RESIN REACTION PRODUCTS

Leonard M. Shorr, Pittsburgh, Pa., assignor to Dow Corning Corporation, Midland, Mich., a corporation of Michigan No Drawing. Application March 7, 1955
Serial No. 492,734

4 Claims. (Cl. 260—42)

This invention relates to the reaction product of certain functional siloxanes and epoxide resins.

The modification of epoxide resins with organosiloxanes and organosilanes has been heretofore carried out by reacting the functional groups in the epoxide with an organosilicon compound containing silicon bonded halogen, alkoxy or hydroxy radicals. When reaction had occurred, the siloxane was linked to the epoxide resin molecules through SiOC linkages. These materials are useful in the preparation of coating compositions and cast articles but they suffer from the disadvantage of having the inherently hydrolytically unstable SiOC linkage in the molecules. As a consequence, these materials are not as resistant to water as the epoxide resins themselves.

It is the primary object of this invention to provide silicone modified epoxide resins which are free of SiOC linkages. Another object is to prepare improved coating compositions. Another object is to prepare materials which have properties different from the straight epoxide resin or the pure silicone resin. Other objects and advantages will be apparent from the following description.

Broadly speaking, the compositions of this invention are condensation products of epoxide resins and certain functional organosiloxanes hereinafter defined. The basis of the preparation of the materials is the reaction between the hydroxyl and epoxy groups in the epoxy resin and the functional siloxane groups which are connected to the silicon by silicon-carbon linkages. By such a procedure it is possible to prepare resinous materials which are tied together by relatively stable linkages such as organic ether linkages, amino linkages, and/or organic ester linkages.

This invention relates to the reaction product of (1) from 1–99 percent by weight of a siloxane consisting essentially of units of the formula $$XR_nSiO_{\frac{3-n}{2}}$$

in which X is a saturated nonaromatic hydrocarbon radical having substituted thereon from 1–2 functional groups of the group consisting of OH, COOH, COO alkyl, $NH_2$ and $CONHR'NH_2$ in which R' is an alkylene radical, all of said functional groups being at least 3 carbon atoms away from the silicon atom, R is a monovalent hydrocarbon or a halogenated monovalent hydrocarbon radical free of aliphatic unsaturation and n has a value from 0–2, which siloxane may contain up to 95 mol percent siloxane units of the formula $$R''_mSiO_{\frac{4-m}{2}}$$

in which R'' is a monovalent hydrocarbon radical, a halogenated monovalent hydrocarbon radical or a halophenoxymethyl radical and m has an average value from 1–3 inclusive, and (2) from 1–99 percent by weight of an epoxide polymer prepared by reacting a polyhydric phenol with a compound selected from the group consisting of polyfunctional chlorohydrins and polyepoxides.

The siloxanes which are employed in the method of this invention must contain at least 5 mol percent functional siloxane units. These functional siloxanes are prepared in accordance with the methods set forth in the copending applications of John L. Speier, Serial No. 398,898, filed December 17, 1953, now U. S. Patent 2,762,823, and Serial Nos. 463,062, now U. S. Patent 2,723,987, and 463,061, now abandoned, both filed October 18, 1954. These applications also show methods of copolymerizing the functional siloxanes with hydrocarbon and halohydrocarbon substituted siloxanes.

For the purpose of this invention the functional siloxanes can be composed of any combination of units of the formula $XSiO_{3/2}$, $XRSiO$, and $XR_2SiO_{1/2}$, together with limited amounts of siloxane units of the formula $R''SiO_{3/2}$, $R''_2SiO$, $R''_3SiO_{1/2}$ and $SiO_2$ units. For the purpose of this invention the various radicals on any one silicon atom may be the same or different and the average number of total organic radicals to silicon can range from 1–3. Thus it can be seen that the siloxanes employed can be either homopolymers or copolymers.

For the purpose of this invention the X radicals substituted on the silicon can be any saturated aliphatic hydrocarbon radical or any saturated cycloaliphatic hydrocarbon radical having from 1–2 of the defined functional groups attached thereto. For the purpose of this invention there can be more than one type of X group in the siloxane. Specific examples of X radicals which are operative in this invention are hydroxylated hydrocarbon radicals such as gamma-hydroxypropyl, 4-hydroxybutyl, 12-hydroxyoctadecyl,

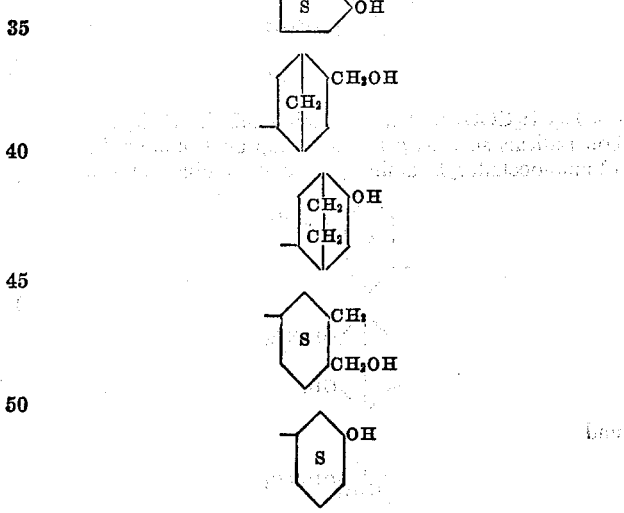

and

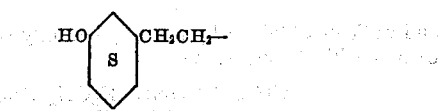

carboxylated hydrocarbon radicals and such as gamma-carboxypropyl, 4-carboxybutyl, 10-carboxydecyl, carboxyheptadecyl, $$\text{HOOCCH}_2\text{CH}_2\overset{\text{COOH}}{\underset{|}{\text{C}}}\text{HCH}_2\text{CH}_2-$$

$$\text{HOOC(CH}_2)_6\overset{\text{COOH}}{\underset{|}{\text{C}}}\text{H(CH}_2)_6-$$

$$\text{HOOC(CH}_2)_6\overset{\text{COOH}}{\underset{|}{\text{C}}}\text{H(CH}_2)_6-$$

carboxycyclohexyl, carboxycyclopentyl,

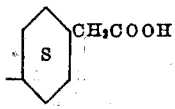

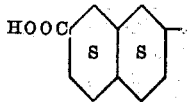

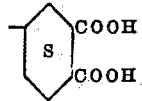

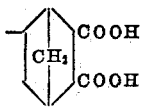

and

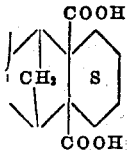

and
the alkyl ester derivatives of any of these carboxylated hydrocarbon radicals such as

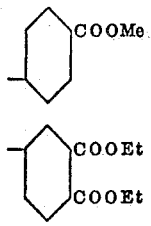

—CH₂CH₂COOPr, etc., and amino substituted hydrocarbon radicals such as gamma-aminopropyl, 4-aminobutyl, 12-aminooctadecyl, aminocyclohexyl, aminocyclopentyl,

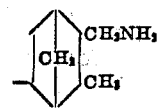

and

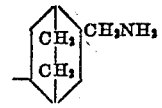

and radicals obtained by reacting carboxy substituted siloxanes with diamines, such as

—CH₂CH₂CONHCH₂CH₂NH₂,
—(CH₂)₃CONH₂(CH₂)₄NH₂,
—(CH₂)₁₇CONH(CH₂)₆NH₂,

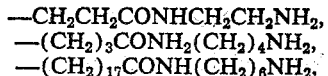

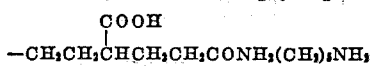

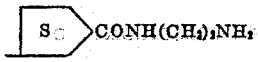

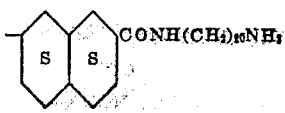

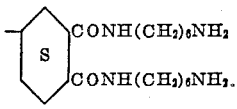

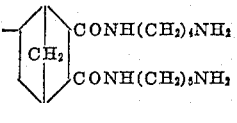

and

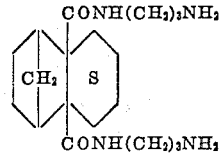

In the above formulas, and throughout this specification, the symbols "Me," "Et" and "Ph" are used to represent methyl, ethyl and phenyl radicals respectively.

In the organofunctional siloxanes R can be any monovalent hydrocarbon radical free of aliphatic unsaturation such as alkyl radicals such as methyl, ethyl and octadecyl; cycloaliphatic radicals such as cyclohexyl and cyclopentyl; aromatic hydrocarbon radicals such as phenyl, tolyl, xenyl and naphthyl and alkaryl radicals such as benzyl or any halogenated monovalent hydrocarbon radical which is free of aliphatic unsaturation such as tetrafluoroethyl, chlorophenyl, tetrafluorocyclobutyl, α,α,α-trifluorotolyl and bromoxenyl.

R" can be any monovalent hydrocarbon radical such as alkyl radicals such as methyl, ethyl and octadecyl; alkenyl radicals such as vinyl, allyl, and hexenyl; cycloaliphatic radicals such as cyclohexyl, cyclopentyl, and cyclohexenyl; aromatic hydrocarbon radicals such as phenyl, xenyl, tolyl and naphthyl; and alkaryl radicals such as benzyl; any halogenated monovalent hydrocarbon radicals such as chlorophenyl, bromoxenyl, trifluorovinyl, chlorotrifluorocyclobutyl, tetrafluoroethyl, and α,α,α-trifluorotolyl, and any halogenated phenoxymethyl radicals such as pentachlorophenoxymethyl, dibromophenoxymethyl, 2,4-dichlorophenoxymethyl and tetrabromophenoxy methyl.

The epoxide polymers which are operative in this invention are known commercial materials and are produced by the reaction of polyhydric phenols with either polyfunctional halohydrins or polyepoxides or mixtures thereof to form complex reaction products containing terminal epoxide groups

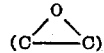

In general, the epoxide resins also contain hydroxyl groups in the molecule. These hydroxyl groups result from the condensation of the epoxy groups in the starting polyepoxide and the hydroxyl groups in the polyhydric phenols.

For the purpose of this invention the epoxide resin may be made from any phenol containing two or more phenolic hydroxyl groups. These hydroxyls can be in one nucleus such as in resorcinol or in different nuclei of fused ring systems as in 1,5-dihydroxynaphthylene or in different nuclei of ring systems attached by chains composed of one or more atoms. In the latter case, the chains should be free from elements which interfere with the reaction of the polyepoxides with the phenolic hydroxyl groups. The phenolic nuclei and/or the chains linking phenolic nuclei can contain any substituent which does not interfere with the reaction of the polyepoxide and the polyhydric phenol.

Specific examples of polyhydric phenols which are used in the resins of this invention are mono-nuclear phenols such as resorcinol, hydroquinone, catechol, phloroglucinol and polynuclear phenols such as bis-p,p'-dihydroxydiphenyldimethylmethane, p,p' - dihydroxybenzophenone, p,p'-dihydroxydiphenyl, p,p'-dihydroxydibenzyl, bis-(4-dihydroxyphenyl)sulfone, 2,2'-dihydroxy 1,1'-dinaphthyl methane, polyhydroxy naphthalenes, and polyhydroxy anthracenes, o,p,o',p' - tetrahydroxydiphenyldimethylmethane, and other dihydroxy or polyhydroxydiphenyl or dinaphthyl methanes.

The term "polyhydric phenol" as employed herein also includes phenols which are condensation products of simpler polyhydric phenols with dichlorides such as dichlorodiethyl ether and dichlorobutene. These materials are assumed to have one of the following general formulae:

$$HOR[OCH_2CH_2OCH_2CH_2OR]_nOH$$

and/or $$HOR[OCH_2CH=CHCH_2OR]_nOH$$

wherein R is a residue from the phenol and n is at least 1. These polymeric condensation products consist of dihydric phenol residues united or joined by and through the residues from the organic dichlorides.

Other polyhydric phenols which are operative herein are condensation products of complex polyhydric phenols with dibasic acids, such as for example the condensation product of adipic acid with a polyhydric phenol to produce a compound of the formula $$HOR[OOC(CH_2)_4COOR]_nOH$$

in which R is a residue from the phenol and n is at least 1.

The polyepoxides which are operative herein as reactants with the polyhydric phenols contain two or more epoxide groups. The simplest diepoxides contain at least 4 carbon atoms such as 1,2 epoxy-3,4 epoxy butane. The epoxy groups can be separated from each other by ether groups or linkages as in the case of bis-(2,3 epoxy propyl)ether and bis - (2,3 epoxy 2 - methyl propyl)ether. Also operative herein are the more complex polyepoxides such as those prepared by reacting 2 or more mols of a diepoxide with 1 mol of dihydric phenol, or 3 or more mols of a diepoxide with 1 mol of trihydric phenol, etc. Polyepoxides derived from polyhydric alcohols such as mannitol, sorbitol, erythritol or polyallyl alcohol can also be used. The polyepoxy compounds used herein can have varying structures and can be of complex structure so long as they do not contain groups which interfere with the reaction between the epoxide groups and the phenolic hydroxyl groups. The polyepoxide reactants employed herein should be substantially free from reactive groups other than epoxide and aliphtic hydroxyl groups.

Simple diepoxides of a high degree of purity can be prepared and obtained by fractional distillation to separate them from by-products formed during their manufacture. For example, bis-(2,3-epoxy propyl)ether or diglycid ether can be produced and separated by fractional distillation to give products of high purity. More complex polyepoxides of higher molecular weight are generally difficult to isolate by fractional distillation, but they can be employed herein after purification to remove objectionable inorganic impurities and catalysts such as caustic alkali. The high molecular weight diepoxide or polyepoxide with admixed by-products such as monoepoxides is operative herein. Particularly well known and useful herein are the reaction products of, for example, epichlorohydrin with a polyhydric alcohol. A specific example of this reaction involves 1 mol of a trihydric alcohol reacted with 3 mols of epichlorohydrin and a catalyst. The epoxide group of the epichlorohydrin reacts with a hydroxyl group of the alcohol and subsequent treatment removes chlorine from the reaction product thus producing the desired polyepoxide. Such polyepoxides can contain less than 3 epoxy groups per molecule even thuogh 3 mols of epichlorohydrin are reacted with 1 mol of a trihydric alcohol. Complex side reactions apparently take place with the resulting production of other compositions containing free hydroxyl groups or cyclic ring compounds or polymeric compounds which can be present in the resulting product. Nevertheless, such products can be employed as polyepoxides for reaction with polyhydric phenols to form the resinous epoxides of this invention.

As noted supra, the polyepoxides can contain varying small amounts of admixed monoepoxides. To the extent that monoepoxides are present they will react with the polyhydric phenols to form terminal groups or residues containing hydroxyl groups and to the extent that such terminal hydroxyl groups are present the complex polyepoxide compositions will contain complex epoxyhydroxyl compounds containing both terminal epoxide containing residues and terminal hydroxyl containing residues. The presence of monoepoxides or of monoepoxy-hydroxyl compounds does not interfere with the desired reaction provided a sufficient amount of polyepoxides is present to serve as polyfunctional reactants with polyhydric phenols.

The reaction conditions and proportions of reactants to be employed and obvious variations of the reaction as well as alternative reactions are set forth in full detail in United States Patent 2,592,560, issued April 15, 1952.

Alternatively, the polyhydric phenol can be reacted with a polyfunctional chlorohydrin such as monochlorohydrins for example epichlorohydrin; dichlorohydrins for example glycerol dichlorohydrin, bis-(3-chloro,2-hydroxy propyl)ether, 1,4-dichloro-2,3-dihydroxy butane, 2-methyl-2-hydroxy-1,3-dichloropropane, bis-(3-chloro,2-methyl, 2-hydroxy propyl)ether, and other mono- and dichlorohydrins derived from aliphatic olefins, mannitol, sorbitol and other alcohols. In short, the term "polyfunctional chlorohydrin" as employed herein includes all compounds which contain at least one epoxide and at least one chlorine atom in the molecule and all compounds containing a chlorine atom and an OH group on adjacent carbon atoms and at least one other chlorine atom in the molecule. It is preferred that the chlorohydrin be substantially free of other functional groups. Epichlorohydrin and/or glycerol dichlorohydrin are particularly useful in this invention.

The proportions of reactants as well as reaction conditions and variations and alternative procedures involved in the polyhydric phenol-polyfunctional chlorohydrin reaction are well known and are set forth in detail in U. S. Patents 2,615,007 and 2,615,008.

It can be seen that a wide variety of products can be made within the purview of this invention. The amount of organosilicon compound can be varied depending upon the desired properties in the finished product. For example, if one wishes to have a room temperature curing product, one should choose organosiloxanes having amino groups in the molecule. These groups react directly with the epoxide groups in the epoxy resins and serve to tie in the siloxane via carbon-nitrogen-carbon linkage. At the same time, this reaction can be used to cure the epoxide resin.

When the siloxane contains alcoholic, carboxylic or ester groups, reaction conditions with the epoxide resin in general require higher temperatures. Carboxylic acid groups or alcoholic groups in the siloxane react with either the epoxide group in the epoxide resin or with hydroxyl groups in said resins. Such reactions may be carried out at temperatures ordinarily employed for the esterification of organic hydroxyl groups and may be carried out either with or without a solvent and with or without esterification catalysts such as metallic oxides. In general this esterification reaction should be carried out at temperatures above 200° C. and is best performed in an inert atmosphere. When the functional group on the siloxane is an ester group, they may be reacted with the hydroxyls in the epoxy group by carrying out an ester interchange. In such reactions the by-product is an alcohol derived from the siloxane ester. This reaction can be carried out at temperatures above 200° C. as above indicated.

The compositions of this invention can be in the form of either thermoplastic or thermosetting resins. The thermoplastic resins are useful in the preparation of molded articles and coatings. These articles may be used under conditions where higher temperatures are avoided. The thermosetting resins have a wider application and are useful in making molded articles, laminates, and coating compositions. The compositions may be thermoset by heat alone or by employing curing catalysts such as organic amines and the like which are normally employed with epoxide resins. In addition, in those cases where the siloxane contains alkenyl groups on the silicon, the compositions can be cured by vulcanizing with organic peroxides.

If desired, the compositions of this invention may be modified by including therein long chain fatty acids such as those derived from soy bean oil, linseed oil, coconut oil and the like. If these acids are unsaturated, they will impart the property of air drying to the compositions of this invention. Such materials are particularly useful for paints. Also the compositions of this invention may be modified by including therein other resinous materials such as phenol-formaldehyde resins, melamine resins, and alkyd resins.

The following examples are illustrative only and are not to be construed as limiting the invention which is properly set forth in the appended claims.

*Example 1*

The siloxane resin employed in this invention had the composition 55 mol percent phenylmethylsiloxane, 15 mol percent monophenylsiloxane, 15 mol percent monomethylsiloxane and 15 mol percent

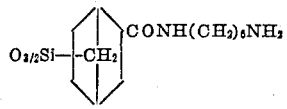

This resin was prepared by reacting the corresponding carboxy acid copolymer with hexamethylenediamine in amount of 2 equivalents of hexamethylenediamine per equivalent of siloxane acid.

The epoxy resin employed in this example was the reaction product of epichlorohydrin and

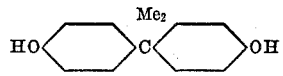

said resin having an epoxide equivalent of 187. The epoxide equivalent is the grams of resin containing 1 gram equivalent of epoxide. The structural formula of the resin was

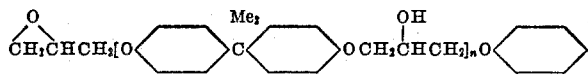

1.9 g. of the organopolysiloxane resin was dissolved in toluene to give a 70 percent solution and this solution was mixed with 2.4 g. of the epoxide resin. After standing at room temperature over the weekend, the mixture had set to a clear, resinous mass which could not be permanently distorted.

A sample of the siloxane resin was mixed with the epoxide resin in amount such that in the mixture there was 1 amino group per epoxy group. A thin film of the mixture was placed between glass plates and heated at 135° C. for 2 hours. A strong bond between the plates was obtained.

An identical epoxy resin was mixed with a polysiloxane having the composition 55 mol percent phenylmethylsiloxane, 30 mol percent monomethylsiloxane and 15 mol percent monophenylsiloxane and with hexamethylenediamine in amount equivalent to the epoxy groups in the resin. After 24 hours at room temperature gelatinous particles began to settle out of the mixture and after several days there was an incompatible gelatinous slurry.

*Example 2*

A siloxane resin having the composition 55 mol percent phenylmethylsiloxane, 15 mol percent monophenylsiloxane, 15 mol percent monomethylsiloxane and 15 mol percent

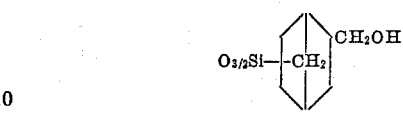

was mixed with the epoxy resin of Example 1 in amount such that there was 1 hydroxyl group per epoxy group and the resulting mixture was spread as a film on a metal plate and cured to a glossy, flexible film which was resistant to toluene.

Another portion of the mixture was cured at elevated temperature in deep section to a hard, brittle, clear, bubble-free resin.

*Example 3*

Equivalent results are obtained when 10 percent by weight of gammahydroxypropyl methylsiloxane is mixed with the epoxy resin of Example 1 and cured at 200° C.

*Example 4*

A thermosetting resinous product is obtained when 30 parts by weight of a polysiloxane having the composition 10 mol percent chlorophenylmethylsiloxane, 25 mol percent phenylvinylsiloxane, 10 mol percent α, α, α-trifluorotolylsiloxane, 25 mol percent pentachlorophenoxymethyl methylsiloxane and 30 mol percent of

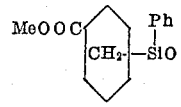

is reacted with 40 parts by weight of the epoxy resin of Example 1 at a temperature of 260° C. in an inert atmosphere until substantially the theoretical amount of methanol is removed from the reaction mixture.

*Example 5*

When a siloxane of the formula

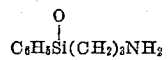

is employed in the procedure of Example 1, equivalent results are obtained.

That which is claimed is:

1. The reaction product of (1) from 1–99 percent by weight of a siloxane consisting essentially of units of the formula

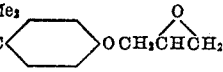

in which X is a saturated nonaromatic hydrocarbon radical attached directly to the silicon atom by C—Si linkage, and having substituted thereon from 1–2 functional groups selected from the group consisting of OH, COOH, COO alkyl, $NH_2$ and $CONHR'NH_2$ in which R' is an alkylene radical, all of said functional groups being at least 3 carbon atoms away from the silicon atom, R is selected from the group consisting of monovalent hydrocarbon radicals and halogenated monovalent hydrocarbon radicals all of which are free of aliphatic unsaturation and $n$ has a value from 0–2 inclusive, which siloxane may contain up to 95 mol percent siloxane units of the formula

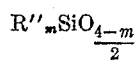

in which R″ is selected from the group consisting of monovalent hydrocarbon radicals, halogenated monovalent hydrocarbon radicals and halophenoxymethyl radicals and m has an average value from 1–3 inclusive and (2) from 1–99 percent by weight of an epoxide resin prepared by reacting a polyhydric phenol with a compound selected from the group consisting of polyfunctional chlorohydrins and polyepoxides.

2. The reaction product of (1) from 1–99 percent by weight of a siloxane consisting essentially of units of the formula

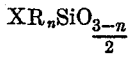

in which X is a saturated nonaromatic hydrocarbon radical attached directly to the silicon atom by C—Si linkage, and having an OH group substituted thereon at least three carbon atoms away from the silicon atom, R is a methyl radical, and n has a value from 0–2 inclusive, which siloxane may contain up to 95 mol percent methylphenylsiloxane having an average of from 1–3 total methyl and phenyl groups per silicon atom and (2) from 1–99 percent by weight of the condensation product of epichlorohydrin and

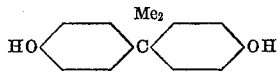

where "Me" represents a methyl radical.

3. The reaction product of (1) from 1–99 percent by weight of a siloxane consisting essentially of units of the formula

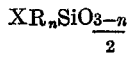

in which X is a saturated nonaromatic hydrocarbon radical attached directly to the silicon atom by C—Si linkage, and having from 1–2 carboxyl groups substituted thereon, R is a methyl radical and n has a value from 0–2 inclusive, which siloxane may contain up to 95 mol percent methylphenylsiloxane having an average of from 1–3 total methyl and phenyl groups per silicon atom and (2) from 1–99 percent by weight of the condensation product of epichlorohydrin and

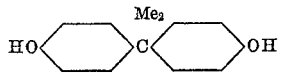

where "Me" represents a methyl radical.

4. The reaction product of (1) from 1–99 percent by weight of a siloxane consisting essentially of units of the formula

in which X is a saturated nonaromatic hydrocarbon radical attached directly to the silicon atom by C—Si linkage, and having substituted thereon from 1 to 2 $CONHR'NH_2$ groups at least three carbon atoms away from the silicon atoms and in which R′ is an alkylene radical, R is a methyl radical and n has a value from 0–2 inclusive, which siloxane may contain up to 95 mol percent methylphenylsiloxane having an average of from 1–3 total methyl and phenyl groups per silicon atom and (2) from 1–99 percent by weight of the condensation product of epichlorohydrin and

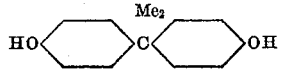

where "Me" represents a methyl radical.

References Cited in the file of this patent

UNITED STATES PATENTS

| | | |
|---|---|---|
| 2,687,398 | McLean | Aug. 24, 1954 |
| 2,695,276 | Hatcher | Nov. 23, 1954 |